Feb. 24, 1931.   W. R. GATES   1,793,604
BELT AND METHOD OF MAKING SAME
Filed Aug. 5, 1926
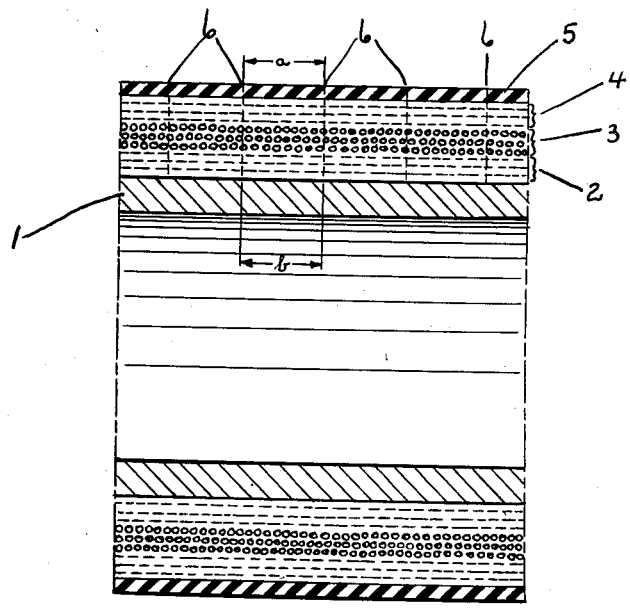
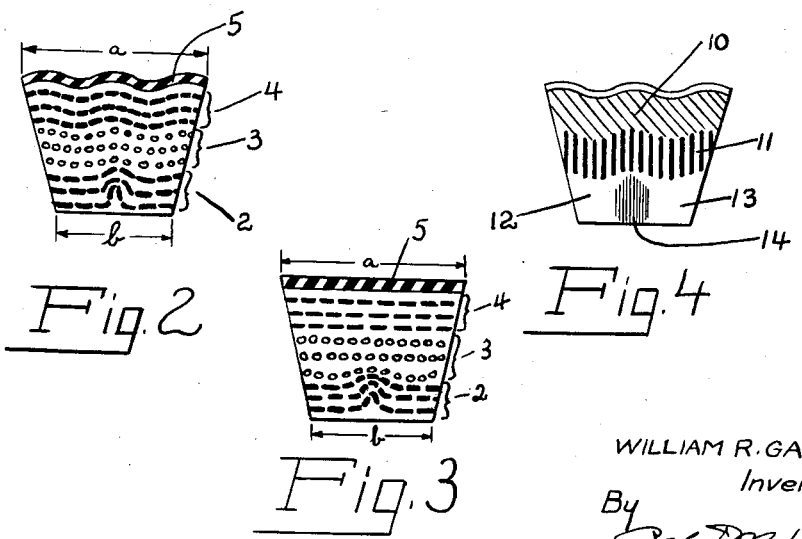
WILLIAM R. GATES
Inventor
By
Attorney Patented Feb. 24, 1931

1,793,604

UNITED STATES PATENT OFFICE

WILLIAM R. GATES, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS

BELT AND METHOD OF MAKING SAME

Application filed August 5, 1926. Serial No. 127,347.

My invention relates to belts of the so called V type, that is, a belt trapezoidal in cross section, and to a method of making the same.

It is among the objects of my invention to provide a method which shall achieve economies in materials and operations and produce a belt superior in strength and length of service. Other and further objects will be apparent from the following specification and claims.

Referring to the accompanying drawings which illustrate one embodiment of my invention Figure 1 is a longitudinal section of a former showing the preferred manner of assembling the belt elements, Figure 2 is a cross section of the molded belt, Figure 3 is a similar section showing an alternative shape, and Figure 4 is a diagrammatical section, indicating the distribution of the strain resisting properties of my belt.

Referring to the drawings 1 indicates the cylindrical former upon which the belt is formed. At 2, 3 and 4 are indicated successive convolutions of bias cut rubberized square woven fabric, rubberized cords, or cord fabric, and bias cut rubberized square woven fabric respectively. A cover of rubber 5 may be applied to the outside of the previously built up material if desired. It will be understood that the number of convolutions of the fabric and cords, as well as the proportion of the two materials used may be varied as desired, or the belt may be formed entirely of bias cut fabric or other suitable material, without departing from the broad scope of my invention. The cylinder of material, built up as above indicated, or otherwise assembled, is now cut as at 6, to form a plurality of raw endless belts, substantially rectangular in cross section. The raw belts are then placed in suitable molds and molded and cured in trapezoidal or so-called V form as shown in Figures 2 and 3. According to my preferred method the distance "$a$" in the finished belts is greater than the same dimension in the raw belt, while the distance "$b$" in the finished belt is less than the same dimension in the raw belt. It will thus be evident that as the mold closes, pressure is first applied to the belt at the base, and the upper portion of the belt being relatively unconfined and free to yield the inner circumferential convolutions or plies buckle upwardly as shown in Figures 2 and 3. This tendency obviously decreases toward the outer circumference of the belt and at the outer convolutions of the belt material the complete closing of the mold stretches or expands the material transversely and in conformity with the mold. In Figure 2 I have shown a belt molded with longitudinal ribs on its outer surface in which case the expanded outer plies or convolutions follow the curvature of the mold. If a plane surfaced mold is used as in Figure 3 the expanded outer convolutions lie substantially in planes transversely of the belt, the inner circumferential plies buckling as before.

In the above method no material is wasted as would be the case if the raw belts were cut to V shape, and a greater number of belts is cut from a given width of material. The material which would be wasted in cutting to V form is incorporated in the belt and with other features of my construction as will now be pointed out produce a belt of increased strength and wearing qualities.

In Figure 4 I have diagrammatically indicated the strain resisting properties of my belt. The area 10 comprises the outer circumferential convolutions of the belt material which in my preferred form is bias cut fabric. This material is stretchable both transversely and longitudinally and as above described has, due to the manner of cutting and molding, been expanded transversely. This area, lying as it does outside of the neutral axis of the belt subjected to the maximum tendency to stretch, as the belt rounds the pulley and should therefore be of the highest resilience consistent with durability. This property is found in a maximum degree in the transversely expanded material of which this area is composed. Area 11 which constitutes the neutral axis of the belt is subject to minimum distortion due to operating conditions and is formed of substantially in-distensible cords which take substantially the entire driving strain. The areas 12, 13 and 14 comprise the inner circumferential convolutions of the belt material and since they lie below the neutral axis of the belt are subject to compression as the belt rounds the pulley. Here resilience is a necessary property but due to the overlying portion of the belt and the support of the pulley the disrupting tendencies are lessened, but a wearing or abrading action is present due to the contact with the pulley. The wear is greatest at the corners of the pulley and areas 12 and 13 formed of bias cut fabric in greater amount than area 10 is adapted to stand the wear imposed upon the corners of the belt and at the same time is sufficiently resilient to withstand distortion. Area 14 comprises the buckled portion of the inner circumferential convolutions. Being formed of bias cut fabric it is resilient, but the concentration of fabric at that point renders area 14 relatively stiff and tends to hold the belt tightly against the pulley preventing slippage.

I claim:

1. The method of making endless V belts which comprises forming the belt of superposed plies of suitable material, expanding the outer circumferential plies transversely, transversely compressing the inner circumferential plies and finishing the belt while the plies are so deformed.

2. The method of making endless V belts which comprises forming the belt of superposed plies of suitable material and substantially rectangular in cross section, shaping the belt to V form by expanding the outer circumferential plies transversely and transversely compressing the inner circumferential plies, and finishing the belt as so shaped.

3. The method of making endless V belts which comprises forming the belt of superposed plies of bias cut fabric, longitudinally positioned cords and bias cut fabric, the whole secured together with vulcanizable material and substantially rectangular in cross section, shaping the belt to V form by expanding the outer circumferential plies of bias fabric transversely, transversely compressing the inner circumferential plies of bias fabric, and vulcanizing the belt as so shaped.

4. The method of making endless V belts which comprises winding successive convolutions of bias cut rubberized fabric, rubberized cords and bias cut rubberized fabric onto a drum, cutting the cylinder of material so formed into a plurality of raw belts rectangular in cross section placing the raw belts in molds adapted to transversely compress the inner convolutions of bias cut fabric to mold the belts into V shape and vulcanizing the so molded belts.

5. The method of making endless V belts which comprises winding successive convolutions of bias cut rubberized fabric, rubberized cords and bias cut rubberized fabric onto a drum, cutting the cylinder of material so formed into a plurality of raw belts rectangular in cross section, placing the raw belts in molds adapted to expand the outer convolutions of bias cut fabric transversely and to transversely compress the inner convolutions of bias cut fabric to mold the belts into V shape, and vulcanizing the so molded belts.

6. The method of making endless V belts which comprises winding successive convolutions of bias cut rubberized fabric, rubberized cords and bias cut rubberized fabric onto a drum cutting the cylinder of material so formed into a plurality of raw belts rectangular in cross section, molding the belts in a mold of substantially V shape so proportioned with respect to the dimensions of the raw belts that during the molding operation the outer convolutions of bias cut fabric are expanded transversely while the inner convolutions of bias fabric are transversely compressed to form longitudinal buckles therein and finally vulcanizing the so molded belts.

7. An endless V belt formed of transverse plies of rubberized material, the interior circumferential plies being longitudinally buckled.

8. An endless V belt formed of transverse plies of rubberized material, the outer circumferential plies comprising transversely expanded bias cut fabric and the inner circumferential plies comprising longitudinally buckled bias cut fabric.

9. An endless V belt formed of transverse plies of rubberized material the outer circumferential plies comprising transversely expanded bias cut fabric, the plies at the neutral axis of the belt comprising longitudinally positioned cords and the inner circumferential plies comprising longitudinally buckled bias cut fabric.

10. An endless V belt formed of a plurality of convolutions of rubberized material, the outer circumferential convolutions comprising transversely expanded bias cut fabric, the convolutions at the neutral axis of the belt comprising longitudinally positioned cords and the inner circumferential convolutions comprising longitudinally buckled bias cut fabric.

In testimony whereof I have signed my name to the above specification.

WILLIAM R. GATES.